United States Patent Office 3,345,430
Patented Oct. 3, 1967

3,345,430
PROCESS FOR RECOVERING GRAFT
COPOLYMER LATEX SOLIDS
Robert H. M. Simon and Bernd Oster, Longmeadow,
Mass., assignors to Monsanto Company, a corporation
of Delaware
No Drawing. Filed Dec. 31, 1962, Ser. No. 248,205
9 Claims. (Cl. 260—876)

This invention relates to a process for recovering latex solids and more particularly relates to a process which permits the economical recovery of substantially moisture-free polymers having a desirable particle size and particle size distribution from latices of polymers having heat distortion temperatures above 0° C.

In the recovery of latex solids, it is usually necessary or desirable to conduct the process so that the recovered solids will be substantially free of moisture and contaminants, such as emulsifying agents and water-soluble salts, and will have a particle size and particle size distribution suitable for subsequent compounding operations. In commercial-scale operations, of course, it is also desirable to conduct the process as economically as possible.

Many known techniques permit the efficient, economical recovery of high quality (i.e., substantially moisture- and contaminant-free, suitable particle-size) rubber solids from latices, but, as is well known, it is difficult to recover high quality solids from latices of polymers having heat distortion temperatures above 0° C. without utilizing expensive and sometimes unduly time-consuming procedures. Thus, when known techniques are used to recover these resinous polymers from latices, it is frequently found that:

(1) The techniques which permit facile, adequate removal of water and contaminants lead to the formation of a high percentage of particles which are smaller than 60 mesh (hereinafter designated as "fines")—disadvantageous because (a) in the case of many polymers, an explosion hazard is created by a high concentration of fines in efficient drying equipment, (b) compounding problems are presented when a polymer which is to be mixed with one or more additives contains too high a percentage of fines, and (c) it is uneconomical to separate and discard the fines in order to avoid the problems which their presence creates.

(2) The techniques which insure a minimum formation of fines make it at least very difficult to accomplish adequate removal of water and contaminants—disadvantageous because of (a) the processing problems presented when the polymer has too high a moisture content, (b) the deleterious effect of the contaminants on polymer properties, and (c) the expense of the equipment required to remove the difficultly-removable water and contaminants.

(3) The larger amounts of water usually present in the coagulum when it is fed to a drier necessitates the use of driers having a large load capacity—disadvantageous because of the greater expense of the larger load capacity driers.

An object of the invention is to provide a novel process for recovering latex solids.

Another object is to provide a process which permits the economical recovery of substantially moisture-free polymers having a desirable particle size and particle size distribution from latices of polymers having heat distortion temperatures above 0° C.

These and other objects are attained by intimately mixing a polymeric latex with an aqueous solution of an electrolyte until a homogeneous, form-sustaining paste is obtained, forming the paste into one or more shaped units having a minimum cross-sectional dimension of about 0.05″, and heating the shaped paste in an aqueous bath maintained at a temperature at least as high as the heat distortion temperature of the polymer to harden and synerize the polymer particles prior to granulating the polymer, if necessary, to a particle size suitable for washing and drying and for subsequent compounding operations, and then washing and drying the polymer particles.

The following examples are given to illustrate the invention. Unless otherwise specified, quantities mentioned in the examples are quantities by weight. All specified heat distortion temperatures of latex solids are determined by ASTM test D–648–56. The percent break-up values shown in the examples represent the percentage of a +30 mesh-sample of the dried product which is reduced to a particle size smaller than 30 mesh after the sample has been ball-milled for 15 minutes. This measure of the friability of the product indicates the resistance of the coagulum to attrition during the process of recovering latex solids and consequently indicates the amount of the product which has a smaller-than-desired particle size. Thus, a low percent break-up value indicates that only a low percentage of the polymer particles are smaller than desired, and a higher percent break-up value indicates that a higher percentage of the polymer particles are smaller than desired.

*Example I*

Latex charge: a mixture of 535 parts of a 33% solids latex of a styrene-acrylonitrile/butadiene rubber graft copolymer and 465 parts of a 33% solids latex of a syrene-acrylonitrile copolymer.
Heat distortion temperature of latex solids: 85° C.
Coagulant charge: 170 parts of a 1.5% aqueous solution of $MgSO_4$.

Feed the latex and coagulant charges at constant rates proportional to the volumes of the charges through separate inlets into a suitable extruder having a barrel diameter of 1.5″, a simple deep-flighted screw of small helix angle rotating at 1800 r.p.m., and a length such that formation of a homogeneous, form-sustaining paste by intimate admixture of the charges is accomplished shortly before the coagulum reaches the exit orifice of the extruder when the screw is rotated at 1800 r.p.m. Allow the extrudate, which is in the form of compressed helical springs having a cross-section of 1.5″, to drop into a mildly agitated aqueous bath containing 0.5 part of $MgSO_4$, maintained at a temperature of 98–100° C. Retain the coagulum in the aqueous bath until the minimum residence time is 40 minutes, and then feed the aqueous slurry of coagulum to a rotary blade granulator equipped at its exit orifice with a screen having openings 0.25″ in diameter. Centrifuge the granulator effluent to remove excess water. The centrifuge effluent has a moisture content of 38%. Wash the centrifuge effluent to remove water-soluble contaminants, recentrifuge to remove the wash water, and dry the product in a warm air rotary drier to a moisture content of less than 0.5%. The product has a break-up value of 5% and the following screen analysis:

Mesh: | Percent
--- | ---
+6 | 5
6–12 | 20
12–20 | 27
20–30 | 11
30–60 | 20
60–100 | 7
–100 | 10

*Example II*

Latex charge: the latex charge of Example I.
Coagulant charge: 130 parts of a 2% aqueous solution of $MgSO_4$.

Repeat Example I except for making the above-indicated change in the coagulant charge and operating the extruder screw at 1950 r.p.m. Similar results are observed.

*Example III*

Latex charge: a mixture of 254 parts of a 43% solids latex of a styrene-acrylonitrile/butadiene rubber graft copolymer and 746 parts of a 33% solids latex of a styrene-acrylonitrile copolymer.
Heat distortion temperature of latex solids: 91.5° C.
Coagulant charge: 255 parts of a 1% aqueous solution of $MgSO_4$.

Repeat Example I except for making the above-indicated changes in the latex and coagulant charges and operating the extruder screw at 1650 r.p.m. Similar results are observed.

*Example IV*

Latex charge: a mixture of 347 parts of a 43% solids latex of a styrene-acrylonitrile/butadiene rubber graft copolymer and 653 parts of a 33% solids latex of a styrene-acrylonitrile copolymer.
Heat distortion temperature of latex solids: 88.5° C.
Coagulant charge: 125 parts of a 1.5% aqueous solution of $Al_2(SO_4)_3$.

Repeat Example I except for making the above-indicated changes in the latex and coagulant charges and employing 0.5 part of $Al_2(SO_4)_3$ instead of 0.5 part of $MgSO_4$ in the aqueous hardening-syneresis bath. Similar results are observed.

*Example V (control)*

Latex charge: the latex charge of Example IV.
Coagulant charge: 20,000 parts of a 0.5% aqueous solution of $MgSO_4$.

Slowly pour the latex charge into a mildly agitated tank containing the coagulant charge, maintained at a room temperature of 97–99° C. Maintain the resultant slurry at this temperature for 40 minutes after completing addition of the latex charge, and then filter. Dry the filter cake to a moisture content of less than 0.5% in an air oven. The product has the following screen analysis:

| Mesh: | Percent |
| --- | --- |
| +4 | 24 |
| 4–8 | 7 |
| 8–20 | 9 |
| 20–40 | 10 |
| 40–60 | 12 |
| 60–100 | 26 |
| —100 | 12 |

*Example VI*

Latex charge: a mixture of 325 parts of a 33% solids latex of a styrene-acrylonitrile/butadiene rubber graft copolymer and 675 parts of a 44% solids latex of a styrene-alpha-methylstyrene-acrylonitrile terpolymer.
Heat distortion temperature of latex solids: 106° C.
Coagulant charge: 105 parts of a 1.5% aqueous solution of $MgSO_4$.

Repeat Example I except for making the above-indicated changes in the latex and coagulant charges and using a different technique to harden and synerize the coagulum. Instead of allowing the extrudate to drop into an aqueous bath maintained at 98–100° C. and retaining it in the bath until the minimum residence time is 40 minutes, feed the extrudate to an autoclave containing an aqueous bath having 0.5 part of $MgSO_4$ dissolved therein, seal the autoclave, heat the contents at 120° C. for 45 minutes, vent the autoclave, and then feed the aqueous slurry of coagulum to the granulator. Similar results are observed.

*Example VII*

Latex charge: a mixture of 543 parts of a 43% solids latex of a styrene-acrylonitrile/butadiene rubber graft copolymer and 457 parts of a 33% solids latex of a styrene-acrylonitrile copolymer.
Heat distortion temperature of latex solids: 70.5° C.
Coagulant charge: 135 parts of a 1.5% aqueous solution of $MgSO_4$.

Feed the latex and coagulant charges at constant rates proportional to the volumes of the charges through separate inlets into the extruder employed in Example I, operating the extruder screw at 1300 r.p.m. Allow the extrudate, a soft paste which is not form-sustaining, to drop onto a 0.125" thick plate perforated with a plurality of 0.125" diameter holes, and press the soft coagulum through the perforations with a cylindrical rubber roller to form spaghetti-like strands of form-sustaining coagulum. Allow these strands to drop into a mildly agitated aqueous bath containing 0.5 part of $MgSO_4$, maintained at a temperature of 95–98° C. Retain the coagulum in the aqueous bath until the minimum residence time is 40 minutes, and then centrifuge the aqueous slurry of coagulum to remove excess water. The coagulum now has a moisture content of about 37%. Wash the coagulum to remove water-soluble contaminants, recentrifuge to remove the wash water, and dry the product in a warm air rotary drier to a moisture content of less than 0.5%. The product has a break-up value of 8% and the following screen analysis:

| Mesh: | Percent |
| --- | --- |
| +4 | 2 |
| 4–8 | 6 |
| 8–20 | 19 |
| 20–40 | 24 |
| 40–60 | 19 |
| 60–100 | 13 |
| 100–200 | 10 |
| —200 | 7 |

*Example VIII (Control)*

Repeat Example VII up to and including the step of forming spaghetti-like strands of form-sustaining coagulum. Then wash the coagulum to remove water-soluble contaminants. Virtually 100% of the coagulum breaks up into fines during washing.

*Example IX (Control)*

Repeat Example VII up to and including the step of forming spaghetti-like strands of form-sustaining coagulum. Convey the strands emerging from the perforated plate directly to the warm air rotary drier on a moving belt. The coagulum entering the drier has a moisture content of 67%. Dry the coagulum to a moisture content of less than 0.5%. The product has a break-up value of 60%.

*Example X*

Latex charge: a mixture of 543 parts of a 43% solids latex of a styrene-acrylonitrile/butadiene rubber graft copolymer and 457 parts of a 33% solids latex of a styrene-acrylonitrile copolymer.
Heat distortion temperature of latex solids: 70.5° C.
Coagulant charge: 200 parts of a 1.5% aqueous solution of $MgSO_4$.

Feed the latex and coagulant charges at constant rates proportional to the volumes of the charges to a T-form mixing nozzle having 0.75" bore arms and a 0.75" bore stem which is 6" long. Allow the effluent, a non-homogeneous paste which contains more than 10% free latex and is not form-sustaining, to drop onto a 0.125" thick plate perforated with a plurality of 0.125" diameter holes, and press the paste through the perforations with a cylindrical rubber roller to form spaghetti-like strands of homogeneous, form-sustaining coagulum containing less than 5% free latex. Allow these strands to drop into a mildly agitated aqueous bath containing 0.5 part of $MgSO_4$, maintained at a temperature of 95–98° C. Retain the coagulum in the aqueous bath until the minimum residence time is 40 minutes, and then centrifuge the aqueous slurry of coagulum to remove excess water. Wash the coagulum to remove water-soluble contaminants, re-centrifuge to remove the wash water, and dry the product in a warm air rotary drier to a moisture content of less than 0.5%. Results similar to the results of Example VII are observed.

In the practice of the invention, solids are recovered from a polymeric latex by intimately mixing the latex with an aqueous solution of an electrolyte until a homogeneous, form-sustaining paste is obtained, forming the paste into one or more shaped units having a minimum cross-sectional dimension of about 0.05", and heating the shaped paste in an aqueous bath maintained at a temperature at least as high as the heat distortion temperature of the polymer to harden and synerize the polymer particles prior to granulating the polymer, if necessary, to a particle size suitable for washing and drying and for subsequent compounding operations, and then washing and drying the polymer by conventional techniques.

Polymeric latices which can be treated in accordance with the present invention include latices of a variety of types of water-insoluble vinylidene polymers, e.g., rubbery polymers of one or more conjugated 1,3-dienes such as butadiene, isoprene, piperylene, chloroprene, etc., including copolymers thereof with one or more comonomers such as styrene, alpha-methylstyrene, alkyl (meth)acrylates, (meth)acrylonitrile, etc.; resinous copolymers of such diene with one or more such comonomers; polymers of one or more monovinylidene monomers such as acrylonitrile, methacrylonitrile, alkyl acrylates and methacrylates (e.g., methyl acrylate, ethyl acrylate, butyl acrylate, 2-ethylhexyl acrylate, the corresponding methacrylates, etc.), monovinylidene aromatic monomers (e.g., styrene, alpha-methylstyrene, o-methyl- and other ar-alkylstyrenes, p-chloro- and other ar-halo-styrenes, vinyl naphthalene, etc.), vinyl chloride, vinyl acetate, etc.; and mixtures of such polymers. These latices contain emulsifying agent, e.g., fatty acid soaps, which keep the polymer particles dispersed in the aqueous medium until the latex and electrolyte are mixed, and they frequently contain optional additives such as antioxidants, heat and light stabilizers, pigments, dyes, etc.

Since many techniques which permit the efficient, economical recovery of high quality solids from rubber latice are already known, the present invention—although utilizable in the recovery of rubber solids—is most advantageously applied to the recovery of solids from latices of polymers or polymer mixtures having heat distortion temperatures above 0° C. A preferred embodiment of the invention is its use in recovering solids from:

(1) A latex of a graft copolymer of (a) a monovinylidene aromatic monomer such as styrene; ar-alkylstyrenes, e.g., o-, m-, and p-methylstyrenes, 2,5-dimethylstyrene, p-butylstyrene, etc.; ar-halostyrenes, e.g., o-, m-, and p-chlorostyrenes, p-bromostyrene, 2,5-dichlorostyrene, 2-chloro-4-methylstyrene, etc.; alpha-alkylstyrenes such as alpha-methylstyrene; vinyl naphthalent; and mixtures thereof and/or (b) an acrylic monomer such as acrylonitrile; methacrylonitrile; a $C_1$–$C_4$ alkyl acrylate or methacrylate, e.g., methyl acrylate, butyl methacrylate, etc.; and mixtures thereof on (c) a rubbery polymer of a conjugated 1,3-diene, e.g., natural rubber, homopolymers of butadiene, isoprene, chloroprene, etc., copolymers of two or more such dienes, copolymers of at least 50% by weight of one or more such dienes with one or more comonomers such as the monovinylidene aromatic monomers and acrylic monomers mentioned above or (2) Mixed latices of such graft copolymers and polymers of at least one of the monomers of the grafted phase of the graft copolymer.

A particularly preferred embodiment of the invention is its use in recovering solids from mixed latices of (A) a graft copolymer of (1) about 15–90 parts by weight of a mixture of 20–95% by weight of a monovinylidene aromatic monomer (especially styrene or a mixture of styrene and alpha-methylstyrene) and 80–5% by weight of an acrylic monomer (especially acrylonitrile) on (2) 100 parts by weight of a rubbery polymer of a conjugated 1,3-diene (especially a cross-linked butadiene polymer containing up to about 20% by weight of combined styrene and/or acrylonitrile) and (B) a copolymer of 20–95% by weight of a combined monovinylidene aromatic monomer and 80–5% by weight of a combined acrylic monomer.

The electrolyte solution which is mixed with the polymeric latex can be an aqueous solution of any of the electrolytes conventionally used to coagulate such latices (e.g., inorganic acids such as hydrochloric acid, sulfuric acid, etc.; organic acids such as formic acid, oxalic acid, acetic acid, etc.; water-soluble metal salts such as the chlorides, nitrates, sulfates, and acetates of sodium, potassium, zinc, calcium, magnesium, aluminum, etc.), preferably an aqueous solution of a polyvalent metal salt.

As is well known, the amount of electrolyte solution required to coagulate a polymeric latex varies with several factors such as the particular electrolyte being used, the concentration of electrolyte in the solution, the solids content and particle size of the latex, the amount of emulsifying agent in the latex, etc. As will be readily understood, the solids content which the coagulum should have in order to be form-sustaining can vary with the particular polymeric latex being coagulated, and the degree of dilution of the electrolyte required to permit intimate admixture of the latex and the electrolyte solution can vary with both the solids content of the latex and the particular technique employed to mix the latex and electrolyte. Thus, several variables determine the optimum amount of electrolyte solution to be mixed with the polymeric latex.

Particularly since the amount of electrolyte required for coagulation can be learned from the electrolyte-coagulation techniques of the prior art, those skilled in the art should have no difficulty in determining the optimum amount of a particular electrolyte solution to mix with a particular polymeric latex in the practice of the present invention. However, as an added guide, it might be noted that (1) the amount of electrolyte employed should be sufficient to accomplish substantially complete coagulation of the latex, since the presence of more than about 5% free latex in the coagulum could make the paste non-homogeneous and lead to excessive formation of fines, (2) excessive amounts of electrolyte are preferably avoided, because the excess electrolyte makes the coagulation more rapid and difficult to control as well as adding to the degree of contamination of the coagulum, (3) the electrolyte solution should be sufficiently dilute to permit intimate admixture of the latex and electrolyte by the particular mixing technique employed in order to avoid the formation of a nonhomogeneous coagulum, and (4) the electrolyte solution should be sufficiently concentrated to avoid the formation of a coagulum containing too much water to be form-sustaining, i.e., capable of being shaped and retaining the shape without the aid of a supporting structure. It is frequently found most convenient to coagulate the polymeric latex by mixing it with an aqueous solution containing about 0.5–5% by weight of an electrolyte in such proportions that the coagulum has a solids content of about 20–50% by weight. However, more or less concentrated electrolyte solutions and higher or lower solids contents in the coagulum are sometimes desirable, since the criticality with regard to the amounts of electrolyte and water employed is that they be such that the coagulum is a homogeneous, form-sustaining paste.

The latex and electrolyte solution can be mixed by any batch or continuous technique suitable for the production of a homogeneous, form-sustaining coagulum, i.e., a technique which accomplishes thorough admixture of the latex and electrolyte solution rapidly enough for a homogeneous coagulum to be formed. Regardless of the particular mixing technique employed, it is preferable to continue mixing only until a homogeneous, form-sustaining coagulum is obtained or at least not for any substantial period thereafter, because further working of the coagulum tends to soften the paste and leads to the formation of fines.

Suitable mixing techniques include, e.g., adding the electrolyte solution to the latex with vigorous agitation, continuously feeding separate charges of latex and electrolyte solution to a mixing chamber at rates such as to maintain a substantially constant latex/electrolyte solution ratio in the chamber and mixing the charges with vigorous agitation, etc. A particularly preferred technique (since it permits the necessarily rapid admixture of the latex and electrolyte solution to be accomplished under minimum shear conditions, thus minimizing fines formation, and also permits facile shaping of the coagulum) comprises continuously feeding the latex and the electrolyte solution through separate inlets into an extruder-mixer having a simple, deep-flighted screw of small helix angle at rates such as to maintain a substantially constant latex-electrolyte solution ratio in the extruder and operating at a screw speed sufficient to accomplish thorough admixture of the latex and electrolyte solution during the residence time in the extruder. Other techniques suitable for the production of a homogeneous, form-sustaining coagulum will be obvious to those skilled in the art.

The homogeneous, form-sustaining paste is formed into one or more shaped units having a minimum cross-section of about 0.05″ to make the coagulum more resistant to attrition during hardening and syneresis, thus minimizing fines formation. Since greater thickness of the shaped units makes them stronger, i.e., more resistant to attrition, there naturally is no limitation on the maximum dimension of the units. However, the longer time required to accomplish complete hardening and syneresis of the thicker shaped units frequently makes it desirable to form the paste into shaped units having a cross-section of about 0.05–5″, preferably about 0.2–2″.

Since the particular shape imparted to the paste is not critical as long as the shaped units have a minimum cross-section of about 0.05″, the manner in which the paste is formed can be varied considerably, depending on the particular shape desired. Shaping can be accomplished, e.g., by pressing the paste through a plate or screen provided with circular, square, or other shaped holes or by extruding the paste through an extruder having an exit orifice diameter of at least about 0.05″, an extruder having an exit orifice provided with a wire dicer having the wires spaced so as to form openings having the desired cross-section, an extruder provided with a die which imparts the desired configuration to the paste, etc. When a single shaped unit is desired, a support such as a moving belt must be provided at the exit orifice of the device, e.g., an extruder, employed to form the shaped unit, because the weight of the coagulum would otherwise cause the shaped unit to break into a plurality of shaped units, the length of which would depend on the cross-section of the unit and the nature of the forces acting on it. Actually, since a single shaped unit offers no advantage over a plurality of shaped units in the practice of the invention, a support for the shaped unit is not often employed unless it is also desired as a convenient means of conveying the shaped unit to the aqueous bath in which hardening and syneresis are to be accomplished.

Since shaping of the coagulum can be an inherent result of the coagulation technique (e.g., when an extruder having a suitable exit orifice is employed in the particularly preferred coagulation technique discussed above) and a shaping technique which causes considerable working of the coagulum (e.g., pressing the coagulum through the holes of a perforated plate) can accomplish at least the final stage of the formation of a homogeneous, form-sustaining coagulum, it is obvious that the coagulation and shaping steps of the present process are not mutually exclusive and that shaping of the coagulum can be begun before the latex and electrolyte solution have been mixed sufficiently for a homogeneous, from-sustaining paste to be obtained. It is, in fact, particularly desirable to have an overlapping between the coagulation and shaping steps when the shaping technique employed is one which causes considerable working of the coagulum, since further working of a coagulum which has already been worked to the stage of a homogeneous, form-sustaining paste tends to soften the paste and lead to the formation of fines. Thus, when such a shaping technique is to be employed, it is usually preferable to terminate the intimate mixing of the latex and electrolyte solution in the mixing device prior to the stage when a homogeneous, form-sustaining paste is obtained and then complete working of the coagulum to the desired consistency during the shaping step, as demonstrated in Examples VII and X.

According to a preferred embodiment of the invention, shaped units of a homogeneous, form-sustaining coagulum are prepared by continuously feeding a polymeric latex and an electrolyte solution through separate inlets into an extruder-mixer having a simple, deep-flighted screw of small helix angle at rates such as to maintain a substantially constant latex/electrolyte solution ratio in the extruder, operating the extruder at a screw speed sufficient to accomplish thorough admixture of the latex and electrolyte solution during the residence time in the extruder, and extruding the resultant homogeneous, form-sustaining paste through a suitable exit orifice, e.g., an orifice having the diameter desired for the shaped units or an orifice provided with a crossed-wire dicer having the wires spaced so as to form openings having the desired cross-section. Since the shaped units can be allowed to drop into the aqueous bath in which hardening and syneresis are to be accomplished, this coagulation-shaping technique—in addition to permitting the formation of shaped units of coagulum under minimum shear conditions—has the advantage of allowing the shaped units to be introduced into the hardening-syneresis bath without manual or mechanical handling, thus minimizing fines formation. An additional advantage of this coagulation-shaping technique is that it permits the formation of hollow shaped units, which can be completely hardened and synerized more quickly than solid shaped units of comparable cross-section.

During coagulation and shaping, the temperature conditions are not critical: coagulation can be accomplished at any temperature above the freezing temperature and below the boiling temperture of the latex; shaping can be accomplished at any desired temperature. Thus, the initial stages of the present process are conducted at any convenient temperature, frequently at room temperature or at another temperature in the 5–30° C. range. During hardening and syneresis, on the other hand, it is critical to maintain the aqueous bath at a temperature at least as high as the heat distortion temperature of the polymer, because no appreciable amount of hardening and syneresis can be accomplished unless the temperature is at least this high. Any temperature above this minimum temperature can be employed, and it is usually preferable to conduct the major portion of the hardening and syneresis at temperatures above the heat distortion temperature of the polymer in order to reduce the time required for complete hardening and syneresis. When temperatures above about 100° C. are required are desired, hardening and syneresis are conducted under pressure in order to maintain the bath in the liquid phase. Unless the polymer has too high a heat distortion temperature to be hardened and synerized at such temperatures, it is usually preferable to employ temperatures in the range of about 90–100° C., more preferably about 95–100° C., in order to accomplish the maximum amount of hardening and syneresis in a minimum time without having to use pressure equipment.

Although, as mentioned above, the coagulum cannot contain more than about 5% free latex, tolerable amounts of free latex are sometimes present in the shaped units. Therefore, it is sometimes desirable to dissolve a minor amount of an electrolyte in the aqueous bath to cause coagulation of the free latex during hardening and syneresis of the shaped units.

Hardening and syneresis in the aqueous bath are continued at least until the interior portions of the shaped units have been hardened and the desired amount of water has been forced from the shaped units by coalescence of the polymer particles, i.e., syneresis. The time required to achieve the desired results naturally varies considerably with the cross-section of the shaped units, the temperature employed, and the amount of syneresis desired but is easily determinable by routine experimentation or heat transfer calculations. As a guide in determining the time required, it might be noted that (1) polymers having lower heat distortion temperatures harden more rapidly at a given temperature, (2) thicker shaped units require longer heating times for complete hardening at a given temperature, (3) higher temperatures decrease the time required to complete hardening of the shaped units and any given degree of syneresis and also permit more complete syneresis, and (4) the amount of syneresis which should be accomplished depends largely on the load capacity of the drier to be employed, since less syneresis is required when the drier has a large load capacity. Heating times of about 30–300 minutes are advantageously employed when shaped units of a polymer having a heat distortion temperature of about 65–75° C. have a cross-section of about 0.05–5″ and are hardened and synerized at about 90–100° C.

When latex solids are being recovered by a continuous process, the aqueous hardening-syneresis bath is agitated sufficiently to keep the shaped units in suspension during hardening and syneresis and permit easy transfer of the shaped units to another aqueous bath, a granulator, or a centrifuge by overflow through a suitable conduit. Since a continuous process technique results in a non-uniform residence time of the shaped units in a single aqueous bath, complete hardening and syneresis of the shaped units should be insured by increasing the average residence time in a single bath or, more advantageously, by employing a series of two or more aqueous baths to make the average residence time more uniform.

The final stages of the present latex solids recovery process can be conducted by conventional techniques. Thus, the hardened, synerized shaped units, when they do not already have a particle size suitable for washing and drying, can be granulated to the desired particle size (usually at least as small as about 4 mesh, with the majority of the particles being about 4–60 mesh) in any suitable apparatus. The polymer having the desired particle size is washed one or more times to remove water-soluble contaminants, separated from the wash water (usually by centrifuging), and dried—advantageously in a warm air rotary drier.

Coagulating, shaping, hardening, and synerizing a polymer in accordance with the present invention—even when the polymer has a heat distortion temperature above 0° C.—result in the formation of a coagulum which is strong enough to permit control of the particle size and particle size distribution obtained by granulation, thus permitting a particle size suitable for adequate washing and drying to be obtained with a minimum coformation of fines or, when desired, with a higher coformation of fines. Whether the particle size suitable for washing and drying is achieved by shaping the homogeneous, form-sustaining coagulum into units having a sufficiently small particle size or by granulating larger shaped units after completion of the hardening-syneresis step, the practice of the invention provides a coagulum which is strong enough to resist attrition during washing and drying, thus minimizing fines formation. An additional and economically important advantage of the process is that the partial dewatering of the coagulum by syneresis permits the use of smaller driers, thus reducing the cost of recovering substantially moisture-free latex solids.

It is obvious that many variations can be made in the products and processes set forth above without departing from the spirit and scope of this invention.

What is claimed is:

1. In a process for recovering solids from a polymeric latex, the improvement which comprises intimately mixing the polymeric latex of a water-insoluble vinylidene polymer having a heat distortion temperature above about 65° centigrade and selected from the group consisting of (a) graft copolymers on a conjugated diene polymer substrate of a monomer formulation consisting essentially of a vinylidene monomer of the class consisting of monovinylidene aromatic monomers, acrylic monomers and mixtures thereof, and (b) mixtures of said graft copolymers with water-insoluble resinous vinylidene homopolymers or interpolymers with an aqueous electrolyte solution until a homogeneous, form-sustaining paste is obtained, forming the paste into at least one shaped unit having a cross-section of about 0.05 to 5.0 inches, and heating the shaped paste in an aqueous bath maintained at a temperature at least as high as the heat distortion temperature of the polymer to harden and synerize the polymer units.

2. The process of claim 1 wherein the polymeric latex is a latex of a graft copolymer of a monomer of the group consisting of a monovinylidene aromatic monomer, an acrylic monomer, and mixtures thereof on a rubbery polymer of a conjugated 1,3-diene.

3. The process of claim 1 wherein the polymeric latex is a mixture of (a) a latex of a graft copolymer of a monomer of the group consisting of a monovinylidene aromatic monomer, an acrylic monomer, and mixtures thereof on a rubbery polymer of a conjugated 1,3-diene and (b) a latex of a polymer of a monomer of the group consisting of a monovinylidene aromatic monomer, an acrylic monomer, and mixtures thereof.

4. The process of claim 1 wherein the aqueous electrolyte solution is a solution of a polyvalent metal salt.

5. The process of claim 1 wherein the shaped units have a cross-section of about 0.2–2″.

6. The process of claim 1 wherein the aqueous bath is maintained at a temperature above the heat distortion temperature of the polymer during at least the major portion of the hardening and syneresis.

7. The process of claim 1 wherein the polymeric latex and aqueous electrolyte solution are separately fed into an extruder, intimately mixed therein until a homogeneous, form-sustaining paste is obtained, and then extruded through an exit orifice having a cross-section of at least 0.05″.

8. A process which comprises intimately mixing a polymeric latex of a water-insoluble vinylidene polymer having a heat distortion temperature above about 65° centigrade and selected from the group consisting of (a) graft copolymers on a conjugated diene polymer substrate of a monomer formulation consisting essentially of a vinylidene monomer of the class consisting of monovinylidene aromatic monomers, acrylic monomers and mixtures thereof, and (b) mixtures of said graft copolymers with water-insoluble resinous vinylidene homopolymers or interpolymers with an aqueous electrolyte solution until a homogeneous, form-sustaining paste is obtained, forming the paste into at least one shaped unit having a minimum cross-section of about 0.05 to 5.0 inches, heating the shaped paste in an aqueous bath maintained at a temperature at least as high as the heat distortion temperature of the polymer to harden and synerize the polymer units, and washing and drying the hardened, synerized paste unit.

9. The process of claim 8 wherein the hardened, synerized paste is granulated to a particle size at least as small as 4 mesh prior to washing and drying.

References Cited

UNITED STATES PATENTS

| | | | |
|---|---|---|---|
| 2,261,769 | 11/1941 | Hordan | 260—821 |
| 2,366,460 | 1/1945 | Semon | 260—876 |
| 2,378,732 | 6/1945 | Semon et al. | 260—876 |
| 2,426,127 | 8/1947 | Thomas et al. | 260—876 |
| 3,074,906 | 1/1963 | Calvert | 260—876 |
| 3,248,455 | 4/1966 | Harsch et al. | 260—876 |
| 3,249,569 | 5/1966 | Fantl | 260—821 |

MURRAY TILLMAN, *Primary Examiner.*

G. F. LESMES, *Assistant Examiner.*